United States Patent [19]

Hayman

[11] Patent Number: 4,459,527
[45] Date of Patent: Jul. 10, 1984

[54] STEPPER MOTOR CONTROL CIRCUIT
[75] Inventor: Charles L. Hayman, Riverside, Calif.
[73] Assignee: Cubic Western Data, San Diego, Calif.
[21] Appl. No.: 477,745
[22] Filed: Mar. 23, 1983

Related U.S. Application Data

[63] Continuation of Ser. No. 211,026, Dec. 1, 1980, abandoned.

[51] Int. Cl.³ .............................................. H02K 29/02
[52] U.S. Cl. ..................................... 318/696; 318/685
[58] Field of Search ....................... 318/696, 685, 138

[56] References Cited

U.S. PATENT DOCUMENTS 4,107,593  8/1978  Anderson ........................... 318/685

Primary Examiner—G. Z. Rubinson
Assistant Examiner—Saul M. Bergmann
Attorney, Agent, or Firm—Brown & Martin

[57] ABSTRACT

A digital input signal is fed through an interface to a logic phase control which decodes the signal to provide a plurality of phase signals in a predetermined relationship for driving a sychronous DC stepper motor. The phase signals are fed to corresponding phase drivers which amplify the pulses of the phase signals before they are applied to the corresponding phase windings of the stepper motor. Each phase driver includes an operational amplifier and a power transistor connected in a closed loop to provide a current pulse having a constant predetermined peak amplitude to the corresponding phase winding during acceleration of the motor. The inductive time constant of the motor phase windings is thus overcome so that an applied mechanical load can be rapidly accelerated without stalling and the absence of dropping resistors minimizes power dissipation and heat generation. A pulse detector turns off the phase drivers after a predetermined time interval following the last pulse of the digital input signal to provide a time brake holding torque and near zero standby power comsumption. Components in the circuit are provided for protecting the power transistors from breakdown due to back emf signals generated in the phase windings.

12 Claims, 6 Drawing Figures

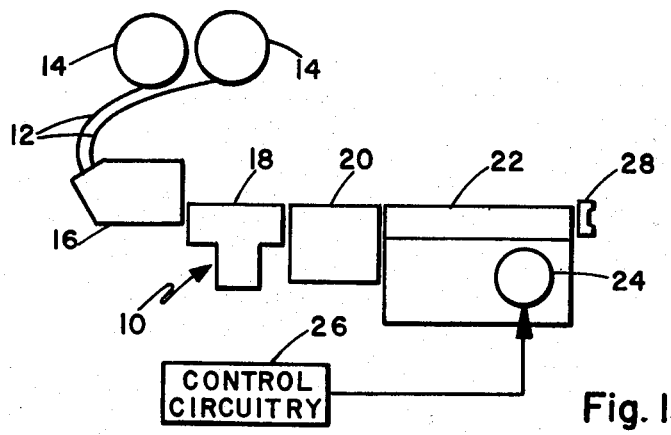
Fig. 1
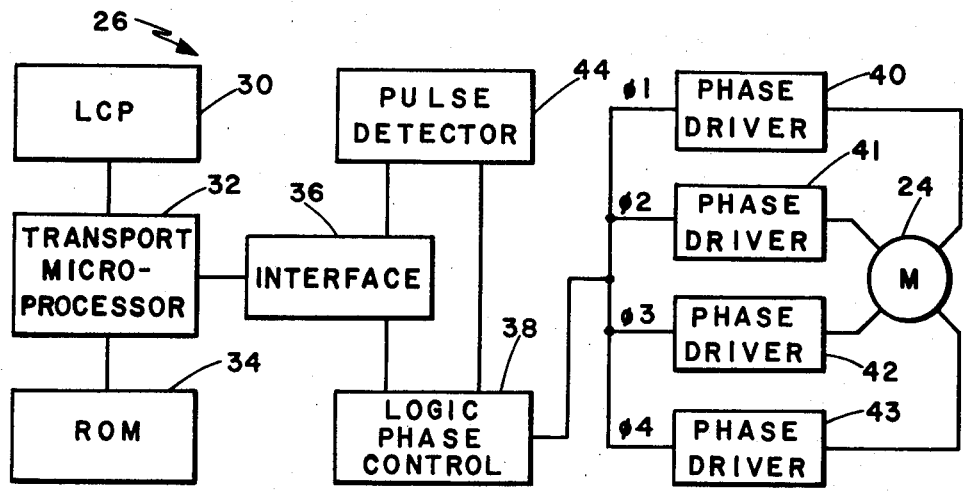
Fig. 2
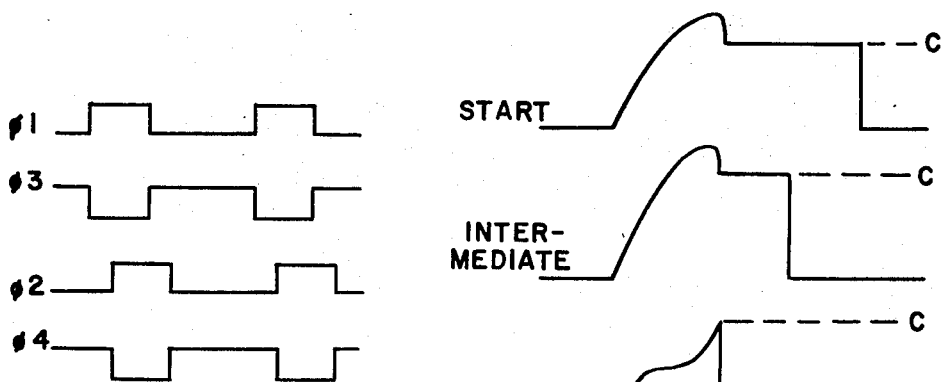
Fig. 3
Fig. 5

STEPPER MOTOR CONTROL CIRCUIT

This is a continuation of application Ser. No. 211,026 filed Dec. 1, 1980, now abandoned.

BACKGROUND OF THE INVENTION

The present invention relates to the control of stepper motors, and more particularly, to a stepper motor control circuit with relatively low power dissipation which produces sufficient motor torque to enable acceleration of an applied mechanical load without stalling of the motor.

In a stepper motor each revolution of the motor shaft is made in a series of discrete identical steps. The design of the motor usually provides for clockwise and/or counter clockwise rotation. A stepper motor is ideally suited for many positional and control applications. It permits use of digital signals to control mechanical motion or position. In addition, the high holding torque associated with each step permits a stepping motor to replace devices such as brakes and clutches, with a gain in system reliability.

Typically a stepper motor will stall if its armature gets more than two steps out of phase due to an applied mechanical load. It is therefore important to drive the phase windings of the stepper motor with sufficient current to provide the torque necessary to accelerate the applied mechanical load. This requires special circuitry since the stepper motor acts like an inductor.

In modern applications of the stepper motor, a control circuit decodes a digital input signal to provide a plurality of phase signals in a predetermined relationship for driving the stepper motor when amplified and applied to corresponding ones of its phase windings. In the control circuit a switching regulator or an L/R drive is typically utilized to overcome the motor's inductive time constant to enable the phase windings to be driven with enough current to permit an applied mechanical load to be accelerated. L/R drives typically dissipate large amounts of power and thus stepper motor control circuits which incorporate them are inefficient and generate substantial heat. Switching regulators offer efficient power control but do not have fast enough response time to provide the acceleration required in some applications. Known stepper motor control circuits have also utilized resistors and diodes to prevent back emf signals in the phase windings of the motor from damaging driver transistors in the circuit. The manner in which these components have been connected has further increased the power dissipation and heat generation of such control circuits.

SUMMARY OF THE INVENTION

It is therefore the primary object of the present invention to provide a stepper motor control circuit with minimum power dissipation.

It is further object of the present invention to provide a stepper motor control circuit of the aforementioned type that can rapidly accelerate the motor under an applied mechanical load, and thereafter maintain a high speed.

It is still a further object of the present invention to provide a stepper motor control circuit of the aforementioned type that has near zero standby power dissipation when the motor is idle.

It is yet another object of the present invention to provide a stepper motor control circuit of the aforementioned type with novel means for protecting the driver transistors from current and voltage breakdown due to back emf signals generated in the phase windings of the motor.

Finally, it is another object of the present invention to provide a stepper motor control circuit which utilizes inexpensive CMOS logic circuitry.

According to the present invention, a digital input signal is fed through an interface to a logic phase control which decodes the signal to provide a plurality of phase signals in a predetermined relationship for driving a sychronous DC stepper motor. The phase signals are fed to corresponding phase drivers which amplify the pulses of the phase signals before they are applied to the corresponding phase windings of the stepper motor. Each phase driver includes an operational amplifier and a power transistor connected in a closed loop to provide a current pulse having constant predetermined peak amplitude to the corresponding phase winding during acceleration of the motor. The inductive time constant of the motor phase windings is thus overcome so that an applied mechanical load can be rapidly accelerated without stalling and the absence of dropping resistors minimizes power dissipation and heat generation. A pulse detector turns off the phase drivers after a predetermined time interval following the last pulse of the digital input signal to provide a time brake holding torque and near zero standby power consumption. Components in the circuit are provided for protecting the power transistors from breakdown due to back emf signals generated in the phase windings.

BRIEF DESCRIPTION OF THE DRAWINGS

FIG. 1 is a simplified view of an automatic ticket vending machine in which a stepper motor controlled by the circuit of the present invention is utilized to rapidly move a ticket.

FIG. 2 is a functional block diagram illustrating the manner in which the circuit of the present invention is utilized to control the stepper motor of the vending machine of FIG. 1.

FIG. 3 illustrates the relationship of the four separate phase signals which are utilized to drive the stepper motor of FIG. 2.

FIG. 5 illustrates the wave forms of the current through the drive transistors of the circuit of FIGS. 4A and 4B during acceleration of the stepper motor.

Throughout the figures, like reference numerals refer to like parts unless otherwise indicated.

DESCRIPTION OF THE PREFERRED EMBODIMENT

Figure 4A:
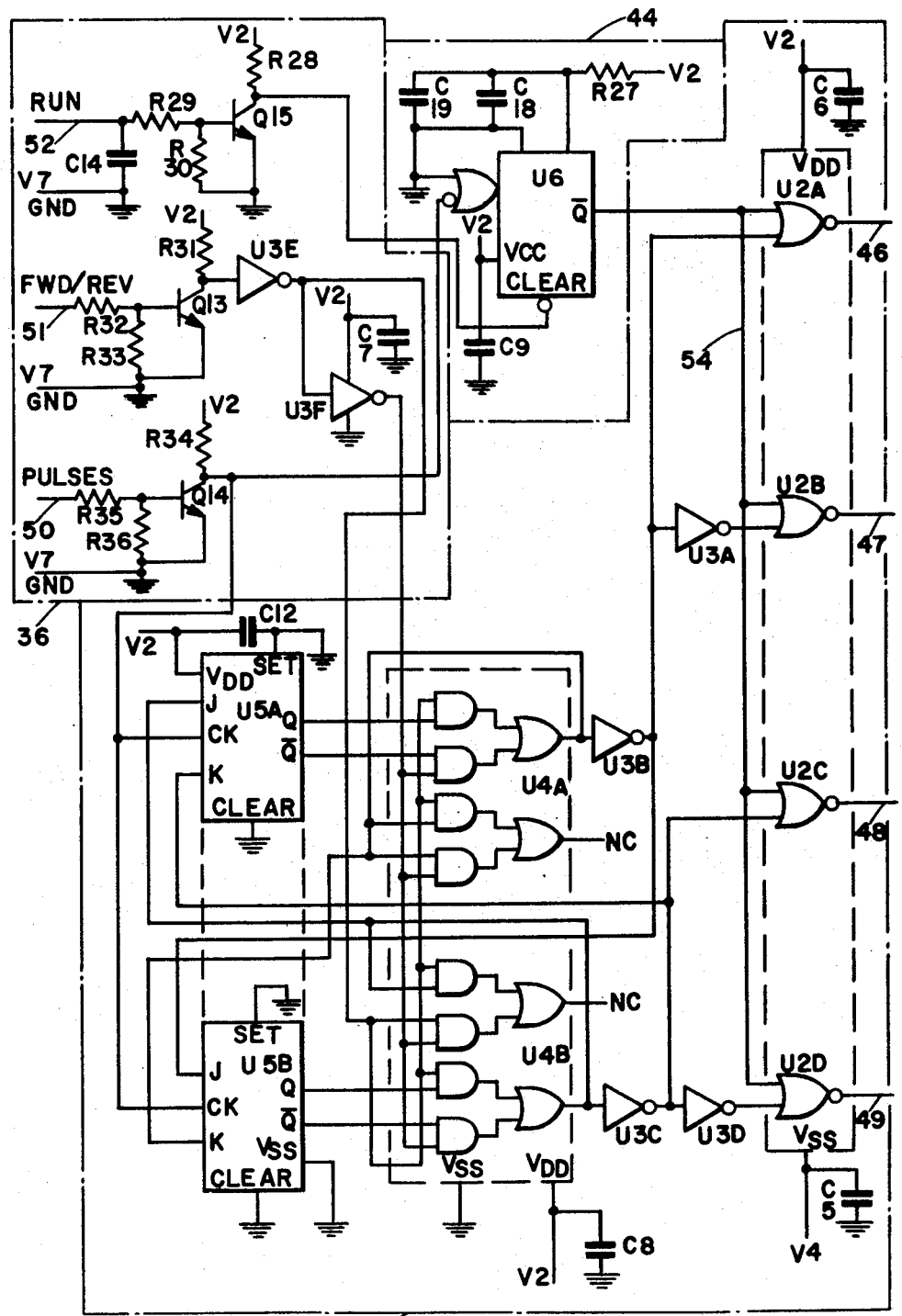
FIGS. 4A and 4B are collectively a schematic diagram of a preferred embodiment of the stepper motor control circuit of the present invention.

Referring to FIG. 1 there is illustrated therein in simplified form an automatic ticket vending machine 10 in which a stepper motor controlled by the circuit of the present invention is utilized to rapidly move a ticket. While the vending machine is not part of the present invention, it illustrates one environment where the stepper motor control circuit of the present invention may be utilized to great advantage. In this vending machine ticket stock 12 is advanced from one of a pair of ticket stock rolls 14 into a feeder/cutter module 16 where a shear cuts off a ticket from the stock. This ticket is advanced to the right through a thermal printer module 18 at slow speed by a reversible AC motor so that alphanumeric information can be printed into a thermal coating on the ticket. The ticket then passes to the right through a static diverter module 20 into a high speed ticket transport module 22. The transport module includes a stepper motor 24 which is operated by circuitry 26 to rapidly move the ticket as hereafter described. The ticket has a strip of magnetic material thereon so that binary information representative of individual fare determination and collection can be encoded onto and read from the ticket.

The circuitry 26 (FIG. 1) controls the stepper motor 24 to rapidly move the ticket within the transport module 22 first to the right, then back to the left, and then back to the right again. This allows a single magnetic head in the transport module to read, write and verify information on the ticket. If the information is properly verified, the ticket is dispensed to the right through an exit bezel 28 to a patron. If the information magnetically printed on the ticket fails the verification step, the ticket is driven to the left, back into the static diverter module 20 from which it exits downwardly into a bin containing defective tickets.

By rapidly reversing the movement of the ticket within the transporter module 22 (FIG. 1) and by moving the ticket to precise locations, the need for sequentially placed read, write and verify magnetic heads is eliminated and the length of the transporter module is minimized. However, the stepper motor 24 must be capable of rapidly accelerating the tickets, for example from zero to 50 inches per second (IPS) in 30 milliseconds. Thereafter the stepper motor must be capable of rapidly decelerating the ticket back down to zero. The stepper motor must also be capable of starting and stopping the ticket at precise, predetermined locations. One suitable stepper motor is the SLO-SYN synchronous DC stepper motor M 092-FD310 manufactured by Superior Electric Company of Bristol, Conn., United States of America. It has 200 steps per revolution and thus each pulse to the motor causes its shaft to rotate approximately 1.8°. It has four separate stator or phase windings. Since the vending machine is utilized on an intermittent basis over a long period of time, it is desirable to minimize the power consumption thereof and reduce the hazards associated with excessive heat generation.

A functional block diagram of the control circuitry 26 of FIG. 1 is shown in FIG. 2. A local control microprocessor (LCP) 30 communicates with a transit station computer (not shown) and commands the various modules of the vending machine 10 (FIG. 1) so that they perform the functions necessary to issue a ticket to a purchasor. The LCP 30 sends signals to a transport microprocessor 32 which in turn commands the transport module 22 to move the ticket. The transport microprocessor 32 also sends data to, and receives data from, the read/write head (not shown) in the transport module 22. Electro-optical sensors (not shown) in the transport module 22 provide ticket position information which enables the transport microprocessor 32 to control ticket movement and speed through the transport module 22 so that the write, read and verify operations can be performed.

Rapid acceleration and deceleration as well as precise ticket position control are achieved by the use of pulse placement acceleration and deceleration timing pulses addressed by the transport microprocessor 32 from a read only memory (ROM) 34 (FIG. 2). The transport microprocessor 32 sends a TTL digital input signal which controls ticket movement to an interface 36 which makes the input signal compatible with a logic phase control 38. The logic phase control decodes the TTL digital input signal to provide phase signals $\phi_1$-$\phi_4$ (FIG. 3) in the relationship required for driving the stepper motor when applied to corresponding ones of its phase windings as is well known in the art. The phase signals $\phi_1$-$\phi_4$ are applied to corresponding phase drivers 40-43 which amplify the phase signals before applying them to the corresponding ones of the phase windings of the stepper motor 24. A pulse detector 44 monitors the TTL digital input signal through the interface 36 and turns the phase drivers 40-43 off through the logic phase control 38 after a predetermined time interval following the last pulse in the input signal. This timer means significantly reduces power dissipation when movement of the ticket is not required.

The preferred embodiment of the stepper motor control circuit of the present invention will now be described in greater detail by way of reference to FIGS. 4A and 4B which collectively illustrate a schematic diagram of the circuit. Wires 46-49 on the right hand side of FIG. 4A are connected to wires 46'-49' respectively, shown on the left hand side of FIG. 4B. It will be understood that the schematic diagram of the preferred embodiment of the circuit has been split so that it can be illustrated on separate sheets. For the sake of clarity, the power supply has not been illustrated in FIGS. 4A and 4B. The necessary operating voltages $V_1$-$V_6$ may be supplied to the circuit where indicated in FIGS. 4A and 4B by any conventional power supply circuitry. In the preferred embodiment the voltages $V_1$-$V_6$ are as follows:

$V_1 = +5$ volts,
$V_2 = +12$ volts,
$V_3 = +34$ volts,
$V_4 = -2$ volts,
$V_5 = -5$ volts,
$V_6 = +34$ volt return,
$V_7 = $ ground.

Referring to FIG. 4A, the portion of the circuit which comprises the interface has been surrounded by phantom lines and marked with reference numeral 36. A lead 50 is connected to the transport microprocessor 32 for receiving the TTL digital input signal therefrom representing pulse placement and timing pulses addressed from the ROM 34. A lead 51 is also connected from the interface circuitry 36 to the transport microprocessor 32 for receiving digital signals from the microprocessor that determine the direction of rotation of the shaft of the stepper motor 24. A lead 52 connects the interface circuitry with the transport microprocessor 32 for receiving digital signals that either enable or disenable the operation of the pulse detector 44, also outlined in phantom lines in FIG. 4A. By way of example, transistors Q13, Q14 and Q15 of the interface 36 may be type 2N2222A and the inverters U3F may be type CD40106.

The logic phase control portion of the preferred embodiment of the circuit is surrounded by phantom lines and marked with reference numeral 38 in FIG. 4A. It includes a pair of FLIP FLOPS U5A and U5B, a pair of AND/OR gates U4A, and U4B four inverters U3A, U3B, U3C, and U3D and four CMOS gates U2A, U2B, U2C, and U2D. The gates U2A, U2B, U2C, and U2D are operated with a split power supply, e.g. between +12 volts and −2 volts so that they function as negative voltage output NOR gates in order to be able to completely turn off the current loops hereafter described in greater detail. This enables a signal from the pulse detector 44, which is tied to each of the U2 CMOS gates, U2A, U2B, U2C, and U2D, by a common lead 54, to simultaneously enable each of the U2 CMOS gates with one control line. By way of example, the U5 FLIP FLOPS, U5A and U5B may be provided by a single chip of type CD4027, the U4 AND/OR gates, U4A and U4B may be provided by a single chip of the type CD4019, and the U2 CMOS gates, U2A, U2B, U2C, and U2D, may be provided by a single chip of the type CD 4001B. The U3 inverters, U3A, U3B, U3C, U3D, U3E, and U3F, in the logic phase control 38 portion of the circuit may be of the type CD40106. The pulse detector 44 may include a one shot monostable multivibrator U7 having a retriggerable time interval of 50 milliseconds. Component U6 in FIG. 4A may be one side of a chip of the type SCL4528.

Figure 4B:
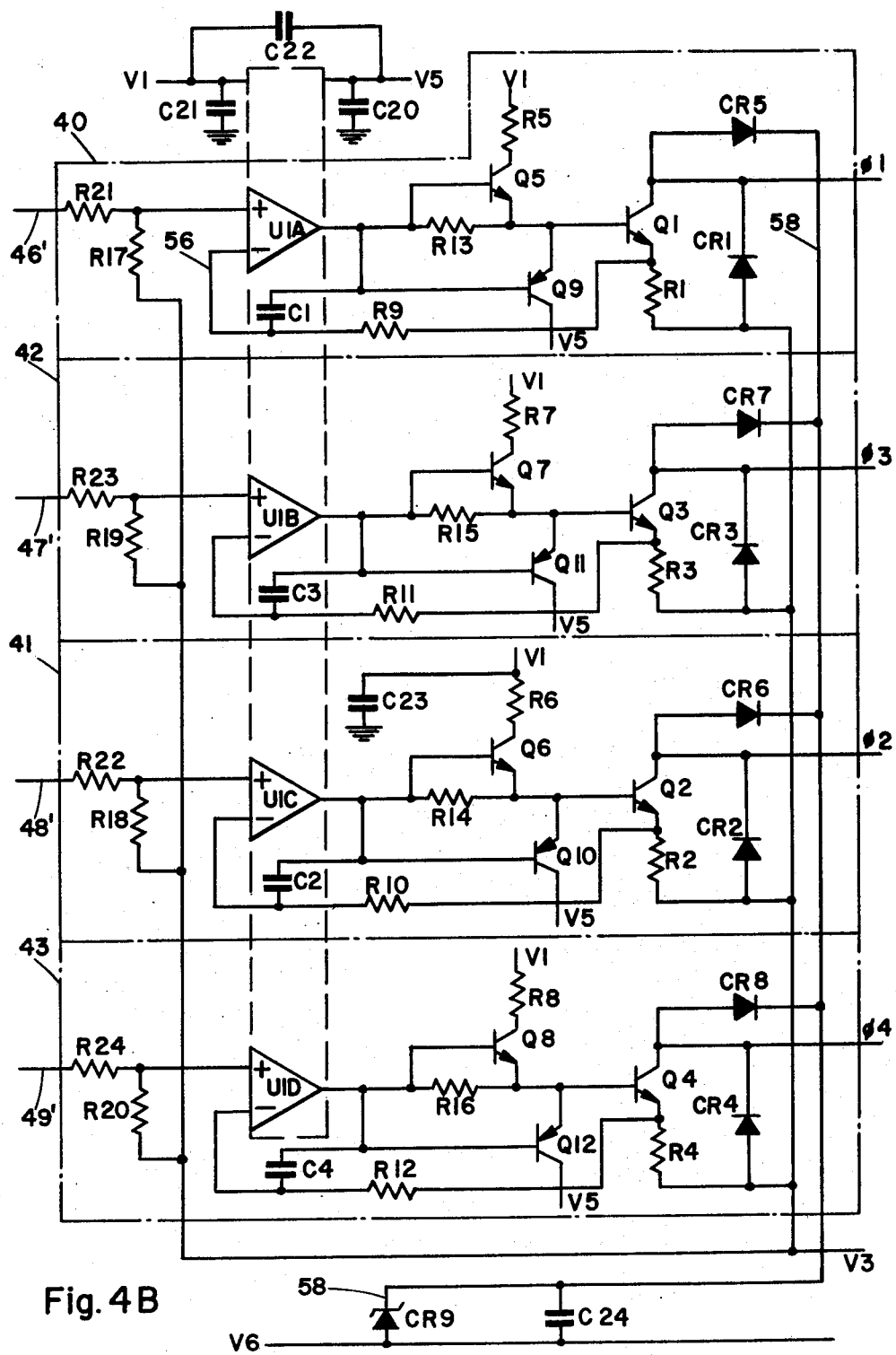

The operation of logic phase control 38 in connection with the U3 inverters, U4 AND/OR gates, and U5 FLIP FLOPS is readily understood with reference to FIG. 4B and the components described above by way of example. Accordingly, one can see that the U5 FLIP FLOPS and the U4 AND/OR gates cooperate in the manner of a Gray Code Generator to receive both a clock signal, such as is derived in FIG. 4A from the PULSES signal on line 50, and a forward-reverse signal, such as is derived in FIG. 4A from the FWD/REV signal on line 51, to provide enabling signals to the U2 CMOS gates. The enabling signals cause the respective phase windings to be sequentially activated in one order when the signal on line 51 represents a FWD logic state and in a reverse order when the signal on line 51 represents a REV logic state. FIG. 3 represents proper sequencing for the forward direction, that being $\phi 1$ followed by $\phi 2$ followed by $\phi 3$ followed by $\phi 4$ followed by $\phi 1$, etc. When signal on line 51 represents a REV logic state, the outputs of the U4 AND/OR gates change phase relationship accordingly so that the U2 CMOS gates are enabled to cause the respective phase windings to be sequentially activated in reverse order, that being $\phi 1$ followed by $\phi 4$ followed by $\phi 3$ followed by $\phi 2$ followed by $\phi 1$, etc. Noting with reference to FIG. 3 that $\phi 1$ and $\phi 3$ are always at opposite levels and that $\phi 2$ and $\phi 4$ are similarly related, it can be readily appreciated that $\phi 1$ corresponds to the "Q" output of U5A, $\phi 3$ corresponds to the "not Q" output of U5A, $\phi 2$ corresponds to the "Q" output of U5B, and $\phi 4$ corresponds to the "not Q" output of U5B, with the U4 AND/OR gates responding to those outputs and to the signals derived from the FWD/REV signal on line 51 to generate the desired phase relationship of the enabling signals.

Referring to FIG. 4B, the portions of the circuit which make up the phase drivers 40-43 are surrounded by phantom lines and marked with corresponding reference numerals. The logic phase control 38 of the circuit produces the four individual phase signals $\phi_1-\phi_4$ (FIG. 3) which are applied to the phase drivers 40-43. The phase drivers 40 and 42 simultaneously drive their corresponding windings in the stepper motor and thereafter phase drivers 41 and 43 simultaneously drive their corresponding windings in the motor in alternating sequential fashion as indicated by the wave forms in FIG. 3.

Each of the phase drivers 40-43 are identical and therefore the construction and operation of only the phase driver 40 will be described by way of example.

When a pulse is received on the lead 46' from the logic phase control 38, a voltage divider consisting of resistors R21 and R17 reduces the amplitude of the pulse to a range acceptable to the positive input of an operational amplifier U1A. In the preferred embodiment of the circuit, resistor R21 may have a resistance of 24K ohms and resistor R17 may have a resistance of 1.5K ohms. A twelve volt pulse is received on the lead 46' and a signal of seven-tenths of a volt is applied to the positive input on the op amp U1A. The signal applied to the positive terminal of the op amp U1A turns the op amp on. The four U1 operational amplifiers U1A, U1B, U1C, and U1D required for the phase drivers 40-43 may be provided by utilizing a quad op amp chip of the type TL084MJ. Operation U2 of the CMOS gates with a split power supply, for example between plus 12 volts and minus 2 volts, insures that each of the U2 op amps is completely turned off to shut down the drive current to its corresponding phase winding at the appropriate times.

Continuing now with a description of the phase driver 40, the output of its op amp U1A is utilized to control a power or driver transistor Q1 which may be of the type 2N6259. The output of the op amp U1A is insufficient to control the transistor Q1. Therefore a current buffer transistor Q5 supplements the output of the op amp U1A to enable the power transistor Q1 to be controlled by the op amp. The current buffer transistor may be of the type 2N3019.

The speed of the motor shaft depends upon the repetition rate of the pulses from the logic phase control portion of the circuitry. However, as the motor speed increases, the inductive time constant of the phase windings of the motor tends to make it more difficult to drive the phase windings with a current pulse having a substantially constant peak current. If the peak current of the pulses driving the phase windings were to decrease as the motor speed increased, this would result in a reduction of motor torque which would in turn lead to stalling of the motor under the mechanical load at some point. In order to maintain adequate motor torque, the phase drivers 40-43 are constructed so that the phase windings are driven with current pulses having a substantially constant peak current during acceleration of the stepper motor under an applied mechanical load.

In the phase driver 40, the op amp U1 and the power transistor Q1 are connected in a closed loop. A resistor R9 and a capacitor C1 in the phase driver 40 serve as frequency stabilizing components which prevent occilation in the closed loop.

The emitter of the power transistor Q1 is connected to ground through a current sensing resistor R1. This resistor has very low resistance such as 0.1 ohms. The current which flows through phase winding $\phi 1$ of the stepper motor develops a voltage across the current sensing resistor R1. This voltage is sensed and fed back to the negative input of the op amp U1 through a lead 56. As the motor speed increases, the op amp U1 turns on the power transistor Q1 harder and harder in order to maintain a constant peak current to the phase winding $\phi 1$. In the preferred embodiment of the circuit, utilizing a stepper motor of the type previously identified, the op amp U1A drives the power transistor Q1 to provide a peak current of approximately 7 amperes to the phase winding $\phi$ during acceleration of the stepper motor.

The wave forms of the current pulses supplied to the phase winding $\phi 1$ by the phase drive 40 at start, intermediate and full speed of the stepper motor are shown in FIG. 5. As these wave forms illustrate, during acceleration of the stepper motor, the drive current supplied to the phase winding φ1 by the phase driver 40 quickly rises until the voltage across the current sensing resistor R1 equals the voltage on the positive input of the op amp U1A. The phase winding current ramps quickly to a predetermined and peak amplitude C which in the preferred embodiment is approximately 7 amperes.

A 20:1 voltage overdrive is used to overcome the inductance of the stepper motor to reach the predetermined peak current rapidly during a pulse. By way of example, the intermediate motor speed in FIG. 5 may be 1000 steps per second. The full operating speed in FIG. 5 may be 2888 steps per second. At full operating speed, the shaft of the stepper motor may be turning at 8666 rpm.

At full operating speed, the base-emitter junctions of the power transistors Q1 are fully turned on when they are pulsed. Substantially less power is required to operate the motor at a sustained full speed than to accelerate the motor and the mechanical load. The closed loop phase drivers maximize the motor torque at slow, intermediate, and full speed. The drivers retain maximum torque utilization at full speed. There is no substantial power dissipated in external resistors in the phase drivers as in conventional stepper motor control circuits employing L/R drives. Thus, power consumption of the stepper motor control circuit of the present invention is minimized, excessive heat generation is eliminated, and the response is fast enough to accelerate the load in the time allowed. Furthermore, the pulse detector 44 (FIG. 2) shuts down each of the phase drivers 40-43 after a predetermined time interval following the last pulse in the TTL digital input signal. As previously indicated, the pulse detector sends a signal along the lead 54 (FIG. 4A) to the U2 CMOS gates to turn off the U1 op amps (FIG. 4B). Thereafter, the power transistors Q1-Q4 and the current buffer transistors Q5-Q8 do not draw any power. Thus, the stepper motor control circuit of the present invention has near zero standby power dissipation. In other words, when the stepper motor 24 is not being operated, almost no power is dissipated in the control circuit except for the minute amount of power required to continuously operate the interface 36, the logic phase control 38 and the pulse detector 44.

Each of the phase drivers 40-43 includes means for protecting its power transistor from secondary breakdown due to back emf signals generated in its corresponding phase winding. Referring by way of example to the phase driver 40 in FIG. 4B, a transistor Q9 which may be type 2N2907 is connected so that it will evacuate the base charge from the power transistor Q1 to effective ground as soon as the op amp U1A is turned off. This turns off the transistor Q1 and prevents excessive current from flowing between its collector and emitter as a result of voltage kickback in the phase winding φ1. Transistors Q10, Q11, and Q12 similarly protect the power transistors of the phase drivers 41-43 from secondary breakdown.

The circuit of the present invention is further provided with means for protecting the power transistors in the phase drivers from voltage breakdown due to back emf signals in the phase windings. Referring to the phase driver 40 in FIG. 4B, a diode CR1 protects the power transistor Q1 from reverse voltage across its collector and emitter. In the preferred embodiment of the circuit, the diode CR1 may be type MR 854. Diodes CR2, CR3, and CR4 similarly protect the other power transistors of the phase drivers 41-43 from reverse voltage across their collectors and emitters. In addition, four diodes CR5, CR6, CR7 and CR8 are connected at their one ends to the collectors of the power transistors Q1-Q4 and at their other ends to a common lead 58 as shown in FIG. 4B. The lead 58 is connected to one side of a transzorb CR9 whose other side is connected to V6 which in the preferred embodiment of the circuit is the +34 volt return. The diodes CR5-CR8 may be type MR 854 and the transzorb CR9 may be type 1N6060A. The transzorb is a zener diode having a quick turn on, for example, one picosecond, and high surge current capability. When the back emf signal from any one of the phase windings rises to a predetermined voltage level, the transzorb CR9 turns on and any voltage above this level is effectively clipped and fed back into the power supply via the terminal V3. The back emf signal on a particular lead connected to a phase winding occurs immediately after its corresponding power transistor is turned off. The foregoing arrangement prevents the voltage on the collector of any one of the power transistors Q1-Q4 from rising above their collector breakdown voltage. This prevents the power transistors from damage due back emf signals in the phase windings. The voltage at the collectors of the power transistors is clamped and cannot rise above the collector breakdown voltage of the power transistors. Since the back emf signals are fed back into the power supply once they rise above a predetermined level, the overall energy consumption of the system is reduced.

In prior stepper motor control circuits, resistors and diodes have been utilized to protect the power transistors from voltage breakdown. However, the resistors and diodes have been connected in such a manner that considerable power has been dissipated through the resistors, resulting in wasted energy and excess heat generation.

The time-out provided by the pulse detector 44 provides an interval after the last pulse in the TTL digital input signal during which two of the phase windings are still energized. This provides a time brake holding torque which insures that mechanical components connected to the shaft of the stepper motor come to rest. After it has timed out, the pulse detector 44 turns off all of the phase drivers to enable the circuit to operate with near zero standby power consumption as previously indicated.

Having described a preferred embodiment of the stepper motor control circuit of the present invention, it will be apparent to those skilled in the art that the circuit can be modified in arrangement and detail without departing from the spirit and scope of the present invention. Therefore the protection afforded my invention should be limited only in accordance with the scope of the following claims.

I claim:

1. A circuit for controlling a stepper motor having a predetermined number of phase windings in response to a digital input signal comprising:
   means for decoding the digital input signal to provide a plurality of phase signals in a predetermined relationship for driving the stepper motor when amplified and applied to corresponding ones of the phase windings; and
   a plurality of driver means, each for amplifying one of the phase signals and applying it to its corresponding one of the phase windings, each driver means including an operational amplifier, a power transistor connected in a closed loop to provide a current pulse having a predetermined peak amplitude to the corresponding one of the phase windings during acceleration of the stepper motor, and means for clamping the voltage of back emf signals so that it does not rise above the predetermined voltage breakdown level of the power transistors.

2. A circuit according to claim 1 and further comprising timer means for turning off all of the driver means if no digital input signal is received by the decoding means during a predetermined time interval.

3. A circuit according to claim 1 wherein each of the driver means includes means for protecting its power transistor from secondary breakdown due to back emf signal in the corresponding one of the phase windings.

4. A circuit according to claim 1 and further comprising means for protecting the power transistors in all of the driver means from voltage breakdown due to back emf signals in each of the phase windings.

5. A circuit according to claim 1 wherein the decoding means includes CMOS logic circuitry operated with a split power supply for enabling the operational amplifiers to be completely turned off by the decoding means.

6. A circuit according to claim 2 wherein the timer means includes a one shot monostable multivibrator.

7. A circuit according to claim 3 wherein the protecting means includes a transistor connected for rapidly evacuating the base charge from the power transistor when the operational amplifier is turned off.

8. A circuit according to claim 1 wherein the protecting means includes a transzorb connected between the return terminal of a power supply and the power transistors.

9. A circuit according to claim 1 wherein each of the phase drivers has a diode connected across the collector and emitter of its power transistor to protect the transistor from reverse voltage breakdown.

10. A circuit for controlling a stepper motor having a predetermined number of phase windings in response to a digital input signal comprising:
means for decoding the digital input signal to provide a plurality of phase signals in a predetermined relationship for driving the stepper motor when amplified and applied to corresponding one of the phase windings, the decoding means including CMOS logic circuitry operated with a split power supply for enabling the operational amplifiers to be completely turned off by the decoding means; and
a plurality of driver means, each for amplifying one of the phase signals and applying it to its corresponding one of the phase windings, each driver means including an operational amplifier and a power transistor connected in a closed loop to provide a current pulse having a predetermined peak amplitude to the corresponding one of the phase windings during acceleration of the stepper motor.

11. A circuit for controlling a stepper motor having a predetermined number of phase windings in response to a digital input signal comprising:
means for decoding the digital input signal to provide a plurality of phase signals in a predetermined relationship for driving the stepper motor when amplified and applied to corresponding ones of the phase windings; and
a plurality of driver means, each for amplifying one of the phase signals and applying it to its corresponding one of the phase windings, each driver means including an operational amplifier and a power transistor connected in a closed loop to provide a current pulse having a predetermined peak amplitude to the corresponding one of the phase windings during acceleration of the stepper motor, each driver means further including means for protecting its power transistor from secondary breakdown due to back emf signals in the corresponding one of the phase windings, said protecting means including a transistor connected for rapidly evacuating the base charge from the power transistor when the operational amplifier is turned off.

12. A circuit for controlling a stepper motor having a predetermined number of phase windings in response to a digital input signal comprising:
means for decoding the digital input signal to provide a plurality of phase signals in a predetermined relationship for driving the stepper motor when amplified and applied to corresponding ones of the phase windings; and
a plurality of driver means, each for amplifying one of the phase signals and applying it to its corresponding one of the phase windings, each driver means including an operational amplifier and a power transistor connected in a closed loop to provide a current pulse having a predetermined peak amplitude to the corresponding one of the phase windings during acceleration of the stepper motor, including a diode connected across the collector and emitter of the power transistor to protect the transistor from reverse voltage breakdown.

* * * * *